(12) United States Patent
Jia

(10) Patent No.: US 9,130,611 B2
(45) Date of Patent: Sep. 8, 2015

(54) METHOD OF USING ZONING MAP FOR BEAM SEARCHING, TRACKING AND REFINEMENT

(75) Inventor: Zhanfeng Jia, Belmont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 407 days.

(21) Appl. No.: 13/588,833

(22) Filed: Aug. 17, 2012

(65) Prior Publication Data

US 2014/0051351 A1 Feb. 20, 2014

(51) Int. Cl.
*H04B 7/04* (2006.01)
*H04B 7/06* (2006.01)
*H01Q 1/00* (2006.01)
*H01Q 3/30* (2006.01)
*H01Q 21/06* (2006.01)

(52) U.S. Cl.
CPC ............ *H04B 7/0408* (2013.01); *H01Q 1/007* (2013.01); *H01Q 3/30* (2013.01); *H01Q 21/061* (2013.01); *H04B 7/0617* (2013.01); *H04B 7/0686* (2013.01); *H04B 7/0695* (2013.01)

(58) Field of Classification Search
USPC ......... 455/12.1, 13.1, 422.1, 423, 434, 456.1, 455/457, 67.11, 550.1, 562, 562.1, 575.1, 455/101
See application file for complete search history.

(56) References Cited

U.S. PATENT DOCUMENTS

| | | | |
|---|---|---|---|
| 5,736,959 A | 4/1998 | Patterson et al. | |
| 6,198,435 B1 | 3/2001 | Reudink et al. | |
| 8,055,300 B2 | 11/2011 | Andersson et al. | |
| 8,068,844 B2 | 11/2011 | Li et al. | |
| 8,755,821 B2 * | 6/2014 | Brisebois et al. | 455/456.1 |
| 2002/0094843 A1 | 7/2002 | Hunzinger | |
| 2002/0098815 A1 | 7/2002 | Hattori et al. | |
| 2011/0045785 A1 | 2/2011 | Sutskover et al. | |
| 2012/0083291 A1 * | 4/2012 | Thomson et al. | 455/456.2 |

OTHER PUBLICATIONS

International Search Report and Written Opinion—PCT/US2013/055334—ISA/EPO—Nov. 7, 2013.

* cited by examiner

*Primary Examiner* — Thanh Le
(74) *Attorney, Agent, or Firm* — Kevin T. Cheatham

(57) ABSTRACT

The disclosure is directed to a wireless communications device. In an embodiment, the wireless communications device comprises a phased antenna array comprising a plurality of antennas, a transceiver operatively coupled to the phased antenna array and configured to control the plurality of antennas and an antenna weight vector (AWV), a memory storing a spherical zoning map, and a beam controller configured to control the transceiver by setting the AWV for each antenna of the plurality of antennas.

35 Claims, 12 Drawing Sheets

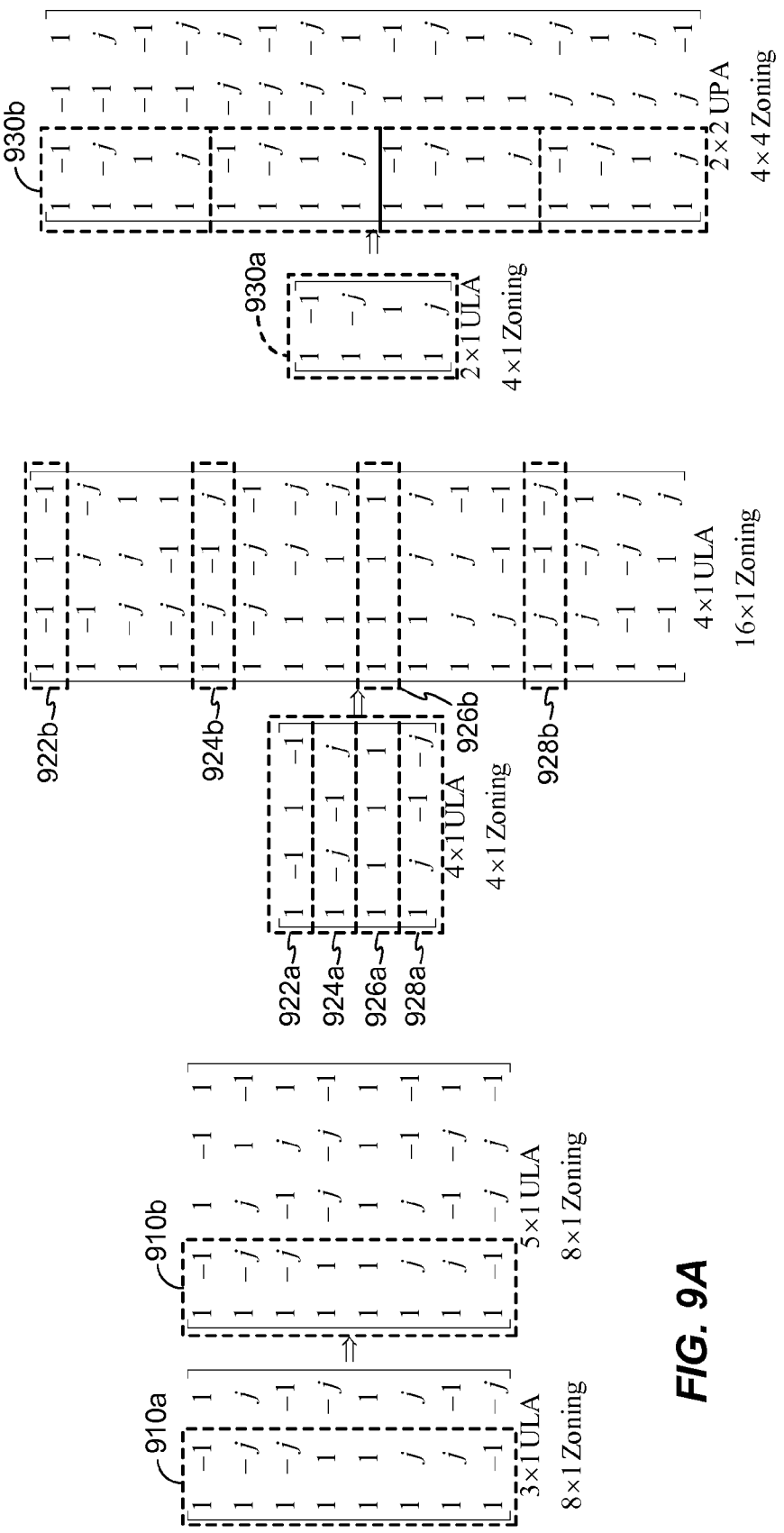

METHOD OF USING ZONING MAP FOR BEAM SEARCHING, TRACKING AND REFINEMENT

FIELD OF DISCLOSURE

The disclosure relates to wireless communications, and more specifically to 60 GHz wireless communications.

BACKGROUND

Wireless communication in the 60 GHz frequency band is characterized by large path loss due to it high frequency. Therefore, the gain of the transmit and receive antenna must increase to meet the link budget requirement. A high-gain antenna directs a relatively narrow beam of radio waves in a particular direction. Because of this, a phased antenna array is installed in order to perform adaptive beamforming.

The 60 GHz frequency band can be used for a Wireless Personal Area Network (WPAN). As a receiver device (such as a laptop, tablet, camera, cell phone, PDA, etc.) moves from a first location to a second location within a room, it may have to switch from one beam to another. However, the receiver does not know in which directions the adjacent/overlapping beams are pointing. Accordingly, the receiver needs to determine which beam is the best of the beams with which it could connect.

SUMMARY

The disclosure is directed to a wireless communications device. In an embodiment, the wireless communications device comprises a phased antenna array comprising a plurality of antennas, a transceiver operatively coupled to the phased antenna array and configured to control the plurality of antennas and an antenna weight vector (AWV), a memory storing a spherical zoning map, and a beam controller configured to control the transceiver by setting the AWV for each antenna of the plurality of antennas.

BRIEF DESCRIPTION OF THE DRAWINGS

The accompanying drawings are presented to aid in the description of embodiments of the invention and are provided solely for illustration of the embodiments and not limitation thereof.

FIG. 9A illustrates antenna weight vectors for an antenna array size that varies from 3×1 to 5×1.

FIG. 9B illustrates antenna weight vectors for spherical zoning sizes that vary from 4×1 to 16×1.

FIG. 9C illustrates antenna weight vectors for both the antenna array size and spherical zoning size varying from one dimension to two dimensions.

DETAILED DESCRIPTION

Aspects of the various embodiments are disclosed in the following description and related drawings. Alternate embodiments may be devised without departing from the scope of the invention. Additionally, well-known elements of the various embodiments will not be described in detail or will be omitted so as not to obscure the relevant details of the various embodiments.

The word "exemplary" is used herein to mean "serving as an example, instance, or illustration." Any embodiment described herein as "exemplary" is not necessarily to be construed as preferred or advantageous over other embodiments. Likewise, the terms "embodiments" or "embodiments of the invention" do not require that all embodiments include the discussed feature, advantage or mode of operation.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the various embodiments may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Figure 1:
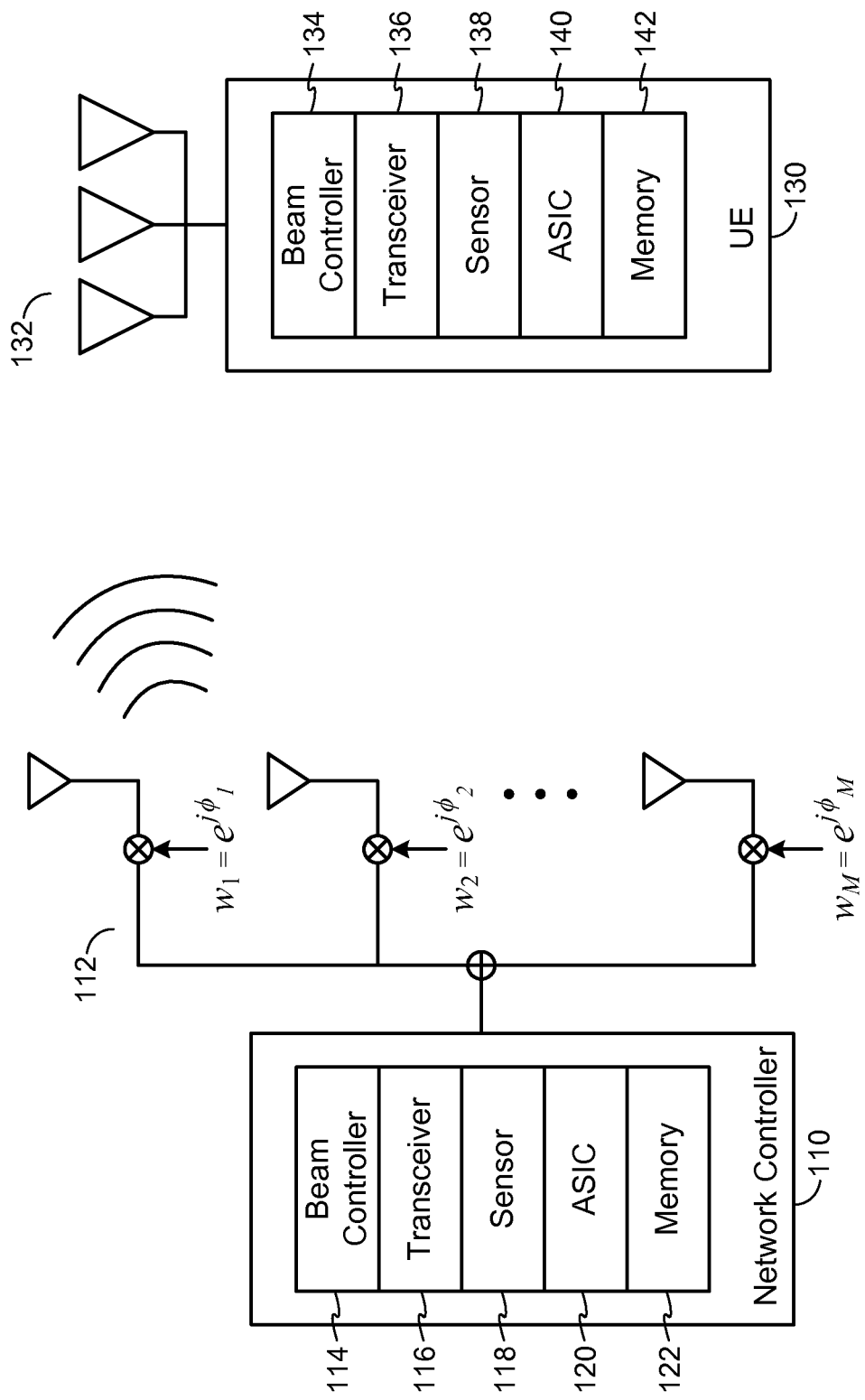
FIG. 1 illustrates a network controller and user equipment according to an embodiment.

FIG. 1 illustrates a network controller 110 and user equipment (UE) 130 according to an embodiment. Network controller 110 comprises a steerable antenna array 112, a beam controller 114, a transceiver 116, a sensor module 118, an application specific integrated circuit (ASIC) 120, or other processor, microprocessor, logic circuit, or other data processing device, and a memory 122. Memory 122 can be comprised of read-only memory (ROM) or random-access memory (RAM), electrically erasable programmable ROM (EEPROM), flash cards, or any memory common to computer platforms. Memory 122 can include a local database that can hold applications not being actively used. The local database may be a flash memory cell, but can be any secondary storage device as known in the art, such as magnetic media, EEPROM, optical media, tape, soft or hard disk, or the like. The internal components of network controller 110 can be operably coupled to external devices, such as antenna 112, as is known in the art.

UE 130 comprises a steerable antenna array 132, a beam controller 134, a transceiver 136, a sensor module 138, an ASIC 140, or other processor, microprocessor, logic circuit, or other data processing device, and a memory 142. Like memory 122, memory 142 can be comprised of ROM or RAM, EEPROM, flash cards, or any memory common to computer platforms. Memory 122 can include a local database that can hold applications not being actively used. The local database may be a flash memory cell, but can be any secondary storage device as known in the art, such as magnetic media, EEPROM, optical media, tape, soft or hard disk, or the like. The internal components of UE 130 can be operably coupled to external devices, such as antenna 132, as is known in the art.

Antenna array 112 can be a phase controlled antenna array. Alternatively, although network controller 110 and UE 130 are shown with an antenna array (112 and 132), other hardware, such as more or less antennas or a single highly directional antenna, could be utilized.

Accordingly, the various embodiments can include a UE including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 120 or 140 and memory 122 or 142 may all be used cooperatively to load, store and execute the various functions disclosed herein and thus the logic to perform these functions may be distributed over various elements. Alternatively, the functionality could be incorporated into one discrete component. Therefore, the features of network controller 110 and UE 130 in FIG. 1 are to be considered merely illustrative and the invention is not limited to the illustrated features or arrangement.

In operation, UE 130 can enter the network region controlled by network controller 110 or can be powered up in the region. UE 130 can listen for a periodic beacon transmission made by network controller 110, and based on receipt of the beacon transmission, can transmit an association request signal to network controller 110.

Wireless communication in the 60 GHz frequency band is characterized by large path loss due to it high frequency. Therefore, the gain of the transmit and receive antenna must increase to meet the link budget requirement. A high-gain antenna directs a relatively narrow beam of radio waves in a particular direction. Because of this, a phased antenna array is installed in order to perform adaptive beamforming.

The 60 GHz frequency band can be used for a Wireless Personal Area Network (WPAN). As a receiver device (such as a laptop, tablet, camera, cell phone, PDA, etc.) moves from a first location to a second location within a room, it may have to switch from one beam to another. However, the receiver does not know in which directions the adjacent/overlapping beams are pointing. Accordingly, the receiver needs to determine which beam is the best of the beams with which it could connect.

The various embodiments generate a spherical zoning map to describe beam direction and beamwidth (referred to herein as "spherical zoning"). Next, the various embodiments select a phased antenna array size that provides the maximum realized gain for each zone (referred to herein as "realizing the zoning"). Finally, the various embodiments use the zone mapping to track the best available beam (referred to herein as "beam tracking and refinement").

Phased Antenna Array

The wireless communication in 60 GHz frequency band is characterized by large path loss due to its high frequency. Therefore, the gain of the transmit and receive antenna must increase to meet the link budget requirement. A high-gain antenna directs a relatively narrow beam of radio waves in a particular direction. Because of this, a phased antenna array is installed in order to perform adaptive beamforming.

In a phased antenna array, each antenna is controlled by a phase shifter. These phase shifters combine to control the radiation pattern (beam) of the antenna array.

Typically, the individual antenna has an omni-directional or quasi-omni directional radiation pattern. The phase shifters cause the combined radiation pattern to be strengthened in some directions and cancelled in some other directions, and thus form the desired beam.

Assuming a phased antenna array, such as antenna 112, has M antenna elements, then for antenna element m, the weight is $w_m = e^{j\theta_m}$, where $\theta_m$ is the phase shift on antenna element m. For practical reasons, the phase shifter has limited resolutions, meaning that $\theta_m$ cannot take arbitrary values. For example, the phase resolution can be limited to $\theta_m$ phases, meaning that $\theta_m$ can be 0°, 90°, 180°, or 270° (i.e. a phase every) 90°, or the phase resolution can be limited to 8 phases, meaning that $\theta_m$ can be 0°, 45°, 90°, 135°, 180°, 225°, 270°, or 315° (i.e. a phase every 45°).

In order for a uniform linear array (ULA) antenna to generate a high gain towards a particular direction, denoted as the steering angle φ, weights are applied to individual antenna element so that the signals reinforce themselves, instead of cancelling themselves. To perform a ULA antenna pattern (i.e. beam) computation, assume each antenna element is omni-directional, with a weight $w_m = e^{j\theta_m}$. The received signal is represented as:

$$y(\phi) = \sum_{m=0}^{M-1} w_m e^{-j\pi m \cos\phi} = \sum_{m=0}^{M-1} e^{-j(\pi m \cos\phi - \theta_m)}$$

When steering to angle φ, $\theta_m = \pi m \cos\phi$ transforms y(φ) to:

$$y(\phi) = \sum_{m=0}^{M-1} e^{-j\pi(m\cos\phi - m\cos\phi)}$$

Given a ULA antenna with a limited phase resolution, then for beam b and antenna element m, the weight is:

$$\theta_{m,b} = \frac{2\pi}{Res} \times \text{round}\left(\frac{Res \times m \times b}{Beam}\right),$$

$$\left(\text{without quantization, } \theta_{m,b} = \frac{2\pi mb}{Beam}\right)$$

where Res is the number of phases (e.g. Res=4 mans 90° resolution and Res=8 means 45° resolution) and Beam is the number of beams. The steering angle of beam b is denoted:

$$\cos\phi_b = \frac{2b}{Beam}$$

Embodiments assume an antenna element has an omnidirectional radiation pattern. In practice, however, the antenna element generally has a quasi-omni directional radiation pattern at best. Such an antenna implementation includes a dipole antenna and a patch antenna.

Embodiments also assume that the antenna array formation is either a ULA or a uniform planar antenna (UPA). However, there could be other formations, such as a hexagon arrangement of elements in an antenna array that will derive a different category of spherical zoning.

Spherical Zoning

Figure 2:
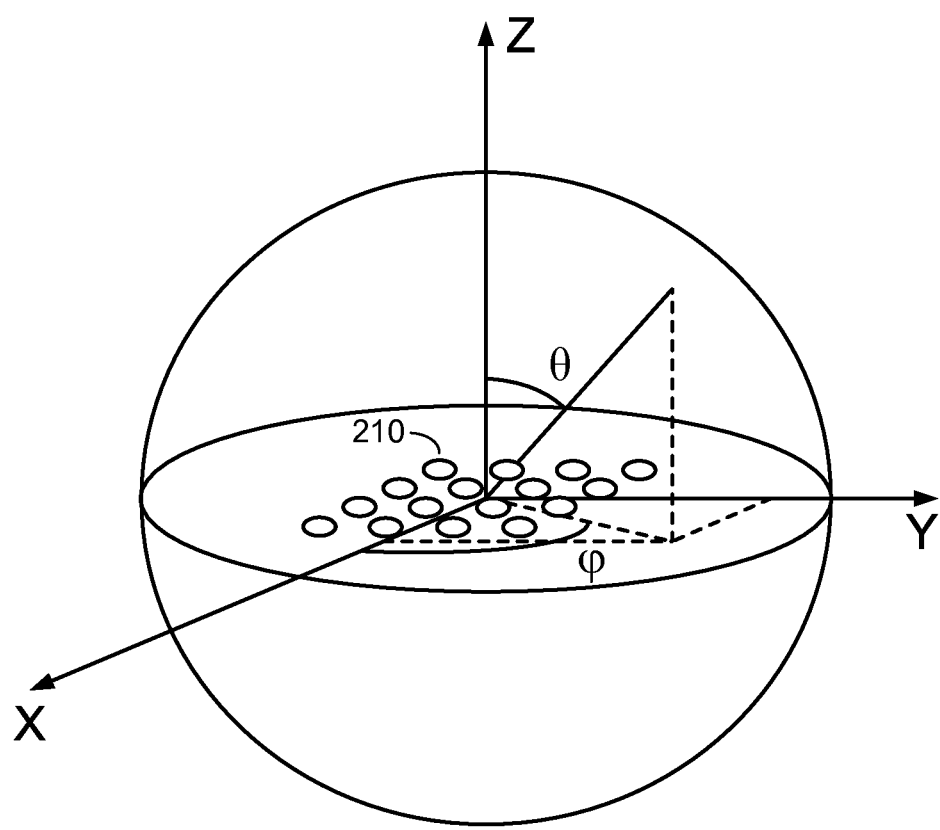
FIG. 2 illustrates the Cartesian and spherical coordinate systems relative to an exemplary antenna array.

The spherical zoning of the various embodiments is based on the Cartesian (x, y, z) and spherical (r, θ, φ) coordinate systems. FIG. 2 illustrates the Cartesian and spherical coordinate systems relative to an exemplary phase controlled antenna array 210. For a ULA antenna, the array elements are placed in a line on the x-axis. For a UPA antenna, such as antenna array 210, the array elements are placed in a two-dimensional (2D) array on the (x-y) plane. The z-axis corresponds to the zenith direction. The angle theta (θ) is the polar angle from the z-axis and the angle phi (φ) is the azimuth angle from the x-axis. The various embodiments do not require a measure of radius (r), as only direction is needed, so r is assumed to be 1.

Conventionally, beam direction can be described using coordinates and beamwidth. For example, a beam could be described as having direction (θ=90°, φ=0° and width (60°× 60°). A problem with this form of description, however, is that it is difficult to describe a beam with an irregular shape. In another example, a beam could be defined using the zoning map defined in the IEEE 802.15.3c specification. This too has limitations, however.

The various embodiments describe beam direction and beamwidth using spherical zoning. In spherical zoning, the sphere of "all directions" from a point (e.g. the antenna array) is divided into a set of numbered, non-overlapping zones. Each zone is a subset of directions, the union of all zones spans all directions, and the intersection of any two zones is the empty set. For ease of identification, each zone is identified by a zone number.

Spherical zones have a number of characteristics. Instead of rectangular division, spherical zones are created based on ULA and UPA formations, as described below. Spherical zoning is a space dividing and searching tool. It is used to illustrate a set of spherical zones, provide a way of numbering spherical zones, enable flexibility of various granularity, and enable search of neighbor zones and refinement zones. Spherical zoning is irrelevant to most antenna characteristics, however, including the number of antenna elements, phase resolution, etc.

Given a UPA formation, the sphere is sliced along the x-axis and along the y-axis into spherical zones. The angle of slicing is 90° between slices. Similarly for a hexagon formation of an antenna array, the sphere can be sliced along the 0°, 60°, and 120° angles, and result in a spherical zoning suitable to the hexagon antenna array formation. Accordingly, the antenna formation can be more than just a ULA or UPA formation.

Embodiments assume that the distance between antenna elements is λ/2, where λ is the wavelength (for the 60 GHz frequency, the wavelength is 0.5 cm, so λ/2 is 2.5 mm). In practice the distance can be slightly larger. Usually this distance cannot be too large, however, because the resulting antenna array would be too large in size. The small variation of the distance simply translate to an additional weight factor (or phase shift factor) imposed on each individual antenna element and therefore does not affect the description of the spherical zoning.

Spherical zones can be represented as a unit sphere, where different zones are represented by different colors and/or numbers, for example. Alternatively, spherical zones can be represented as a 2D zoning map on the (θ–φ) plane. The θ-axis ranges from 0 to π (or 0° to 180°), and the φ-axis ranges from –π to π (or –180° to 180°).

Figure 3A:
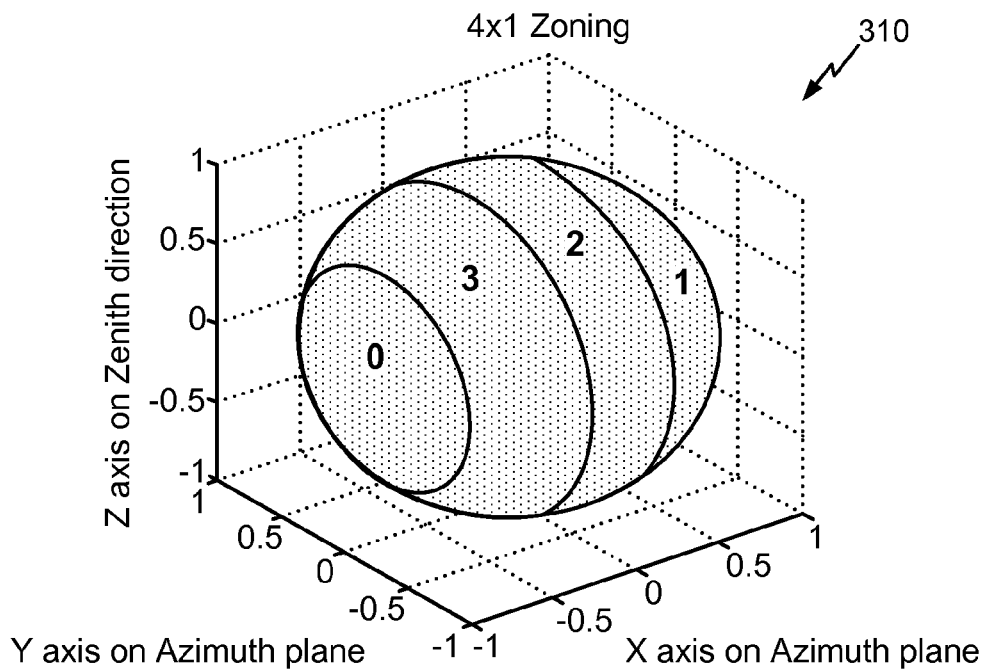
FIG. 3A illustrates a 4×1 spherical zoning represented as a unit sphere.
Figure 3B:
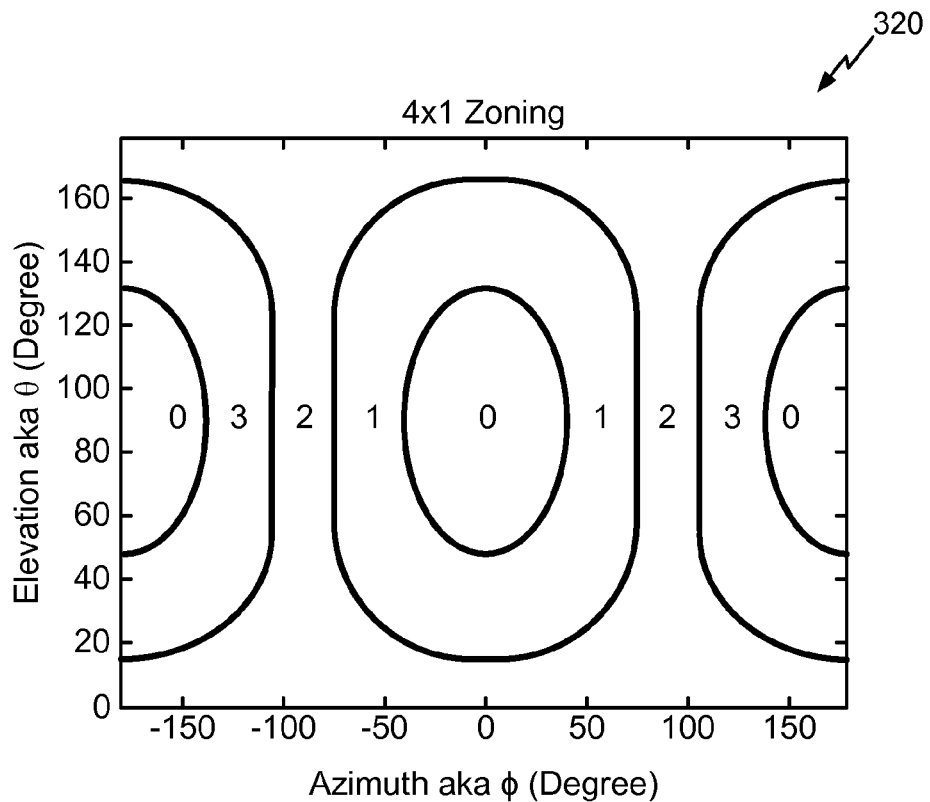
FIG. 3B illustrates a 4×1 spherical zoning represented as a 2D zoning map.

FIGS. 3A and 3B illustrate two different representations of a 4×1 spherical zoning. FIG. 3A illustrates a 4×1 spherical zoning represented as a unit sphere 310, while FIG. 3B illustrates a 4×1 spherical zoning represented as a 2D zoning map 320. Each zone is identified by a zone number. Note that the 2D zoning map 320 of FIG. 3B is equivalent to the unit sphere 310 in FIG. 3A. That is, if the 2D zoning map 320 were wrapped around a sphere, it would show a sphere divided into four zones, similar to the unit sphere 310.

To create a one-dimensional spherical zoning, the x-axis is divided into B zones (in FIG. 3, B is 4). Based on the ULA beam computation, the zone numbers are b∈{0, 1, 2, 3, 4=0}. The steering angle cob with respect to the x-axis is:

$$\cos\phi_b = (1-2b/B) \in \{1, \tfrac{1}{2}, 0, -\tfrac{1}{2}, -1\}.$$

Thus, an arbitrary angle φ belongs to zone b where:

$$b = \text{round}(B \cdot (1-\cos\phi)/2).$$

A spherical zone is around a steering angle φ. For zone 0, φ=±0° and φ=±180°. For zone 1, φ=±60°, for zone 2, φ=±90°, and for zone 3, φ=±120°.

Figure 4A:
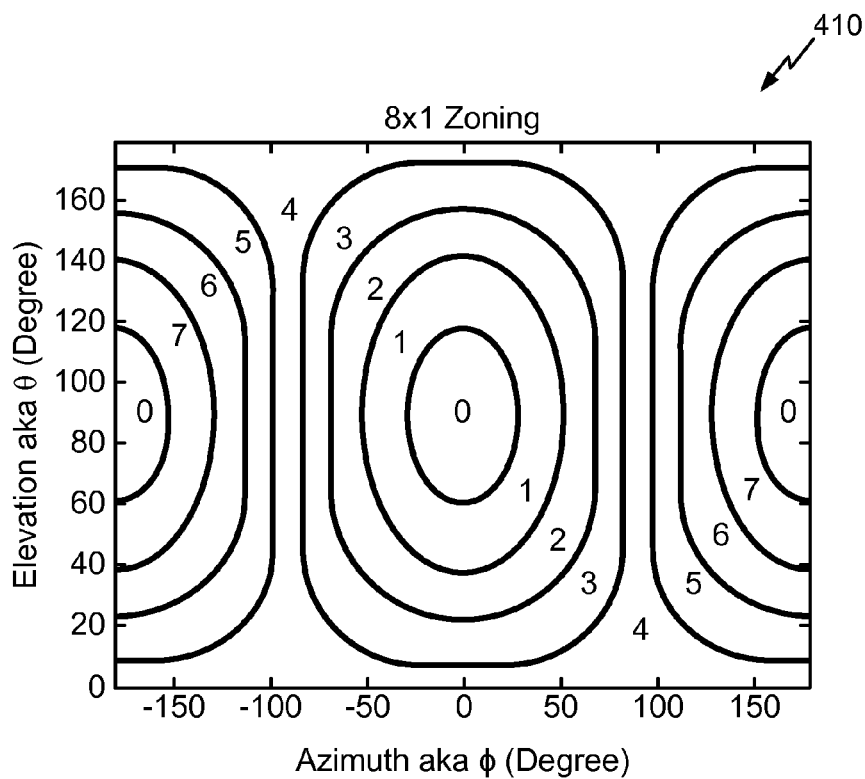
FIG. 4A illustrates an 8×1 spherical zoning represented as a 2D zoning map.

Spherical zoning maps can also be created for larger arrays. FIG. 4A illustrates an exemplary 8×1 spherical zoning represented as a 2D zoning map 410. To create an 8×1 spherical zoning, as with a 4×1 spherical zoning, the x-axis is divided into B zones (in FIG. 4A, B is 8). The zone numbers are b∈{0, 1, 2, 3, 4, 5, 6, 7}. The steering angle φ_b with respect to the x-axis is:

$$\cos\varphi_b = \left(1 - \frac{2b}{B}\right) \in \left\{1, \frac{3}{4}, \frac{1}{2}, \frac{1}{4}, 0, -\frac{1}{4}, -\frac{1}{2}, -\frac{3}{4}, -1\right\}.$$

Thus, an arbitrary angle φ belongs to zone b where:

$$b = \text{round}(B \cdot (1-\cos\phi)/2).$$

A spherical zone is around a steering angle φ. For zone 0, φ=±0° and φ=±180°. For zones 1, 2, and 3, φ=±41°, ±60°, and ±76°. For zone 4, φ=±90°. For zones 5, 6, and 7, φ=±104°, ±120°, and ±139°.

Figure 4B:
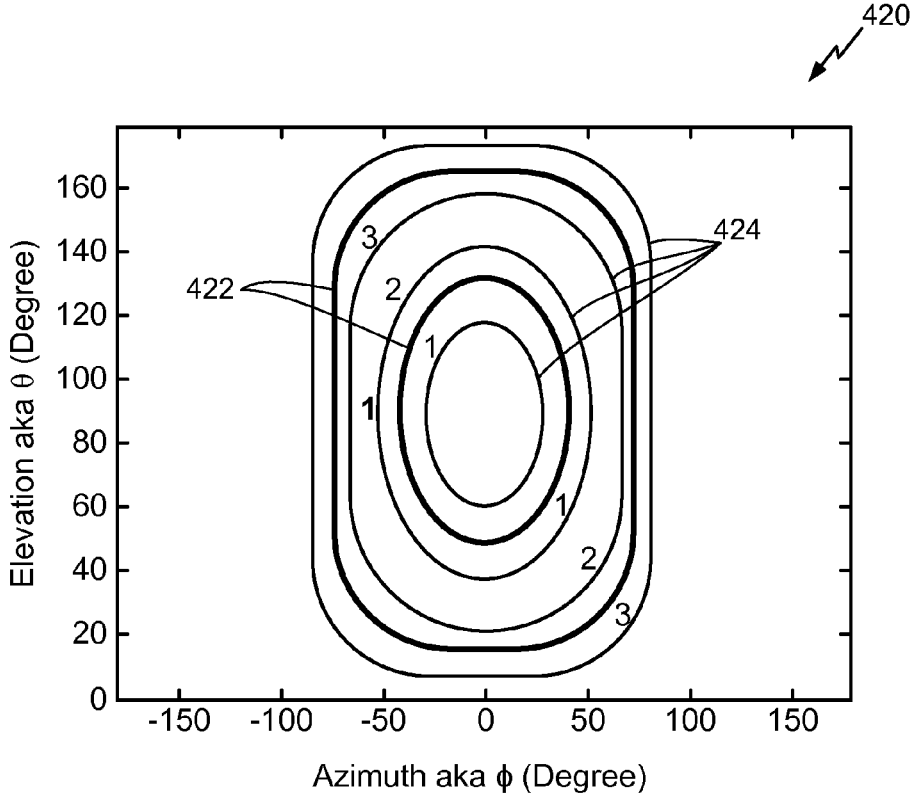
FIG. 4B is a graph illustrating the expansion of a 4×1 spherical zoning to an 8×1 spherical zoning.

FIG. 4B is a graph 420 illustrating the expansion of a 4×1 spherical zoning to an 8×1 spherical zoning. Zone 422 belongs to the 4×1 spherical zoning and zone 424 belongs to the 8×1 spherical zoning. Given a zone number $b_4$ in a 4×1 zoning, the corresponding zone numbers in an 8×1 zoning are $b_8=\{2b_4-1, 2b_4, 2b_4+1\}$. Thus, given a zone number $b_4=1$ in the 4×1 spherical zoning 422, the corresponding zone numbers in the 8×1 zoning 424 are $b_8=\{1, 2, 3\}$. As can be seen, this property is useful in hierarchical beam refinement algorithms.

Figure 5A:
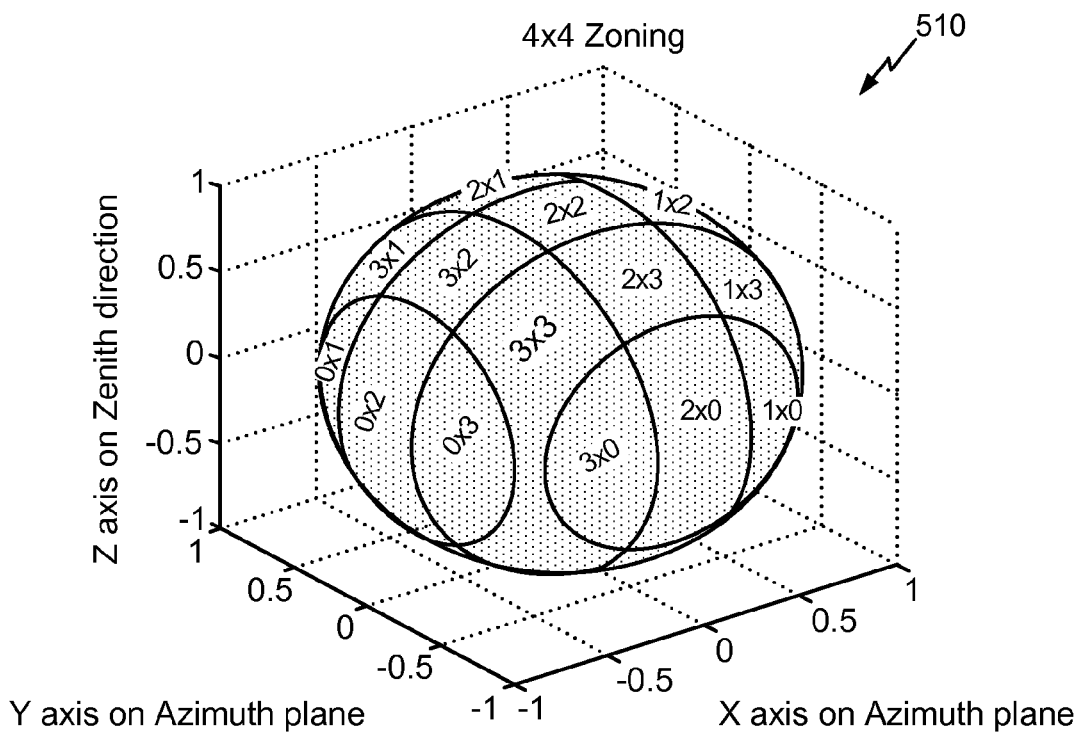
FIG. 5A illustrates a 4×4 spherical zoning represented as a unit sphere.
Figure 5B:
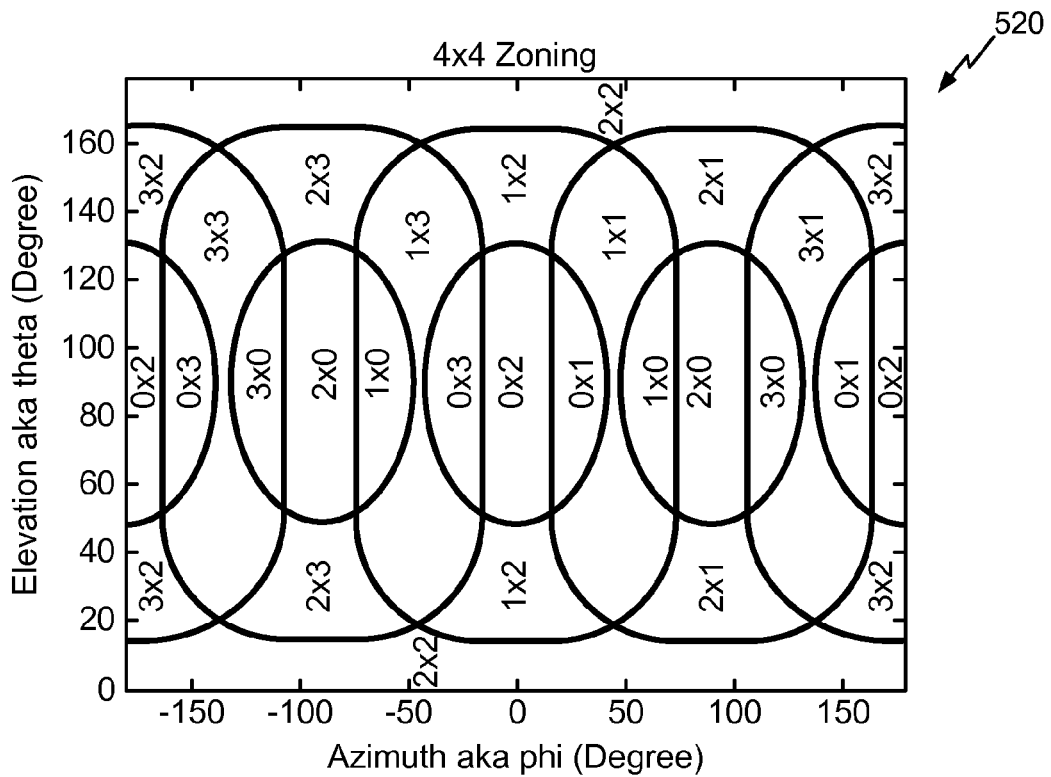
FIG. 5B illustrates a 4×4 spherical zoning represented as a 2D zoning map.

Zoning maps can also be created for 2D antenna arrays. FIGS. 5A and 5B illustrate two different representations of a 4×4 spherical zoning. FIG. 5A illustrates a 4×4 spherical zoning represented as a unit sphere 510, while FIG. 5B illustrates the same 4×4 spherical zoning represented as a 2D zoning map 520. Note that for 2D arrays, the zone numbers must be 2D, e.g. zone number (3×2) in a 4×4 array.

To create a 4×4 spherical zoning, the x-axis and y-axis are independently divided into four zones. Thus, the zone numbers are $(b_x, b_y)_{4\times 4} \in \{0, 1, 2, 3\} \times \{0, 1, 2, 3\}$. The steering angle $(\theta_b, \phi_b)$ satisfies:

$$\cos(\phi_b)\sin\theta_b = (1-2b_x/B_x) \in \{1, \tfrac{1}{2}, 0, -\tfrac{1}{2}, -1\}$$

$$\sin\phi_b \sin\theta_b = (1-2b_y/B_y) \in \{1, \tfrac{1}{2}, 0, -\tfrac{1}{2}, 1\}$$

Thus, an arbitrary angle $(\theta, \phi)$ belongs to zone $(b_x, b_y)_{4\times 4}$ where:

$$b_x = \text{round}(B \cdot (1 - \sin\theta\cos\phi)/2)$$

$$b_y = \text{round}(B \cdot (1 - \sin\theta\sin\phi)/2)$$

Note that not all zone numbers exist. For example, zone number (0, 0) does not exist. Correspondingly, the steering angle equations have no solution.

Figure 6A:
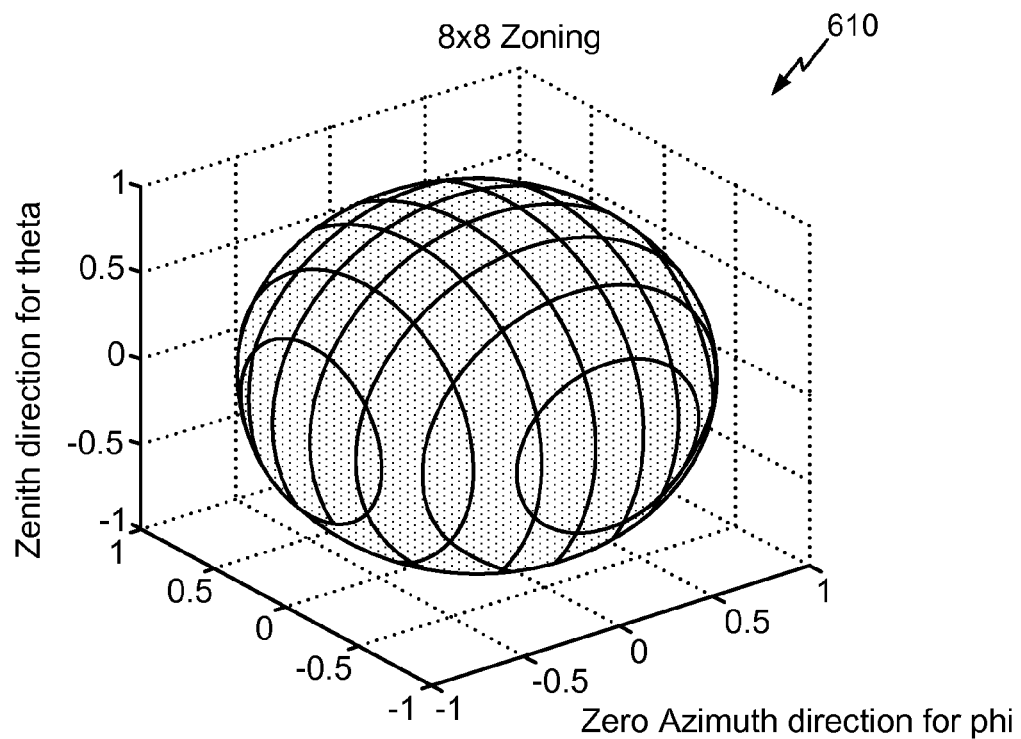
FIG. 6A illustrates an 8×8 spherical zoning represented as a unit sphere.
Figure 6B:
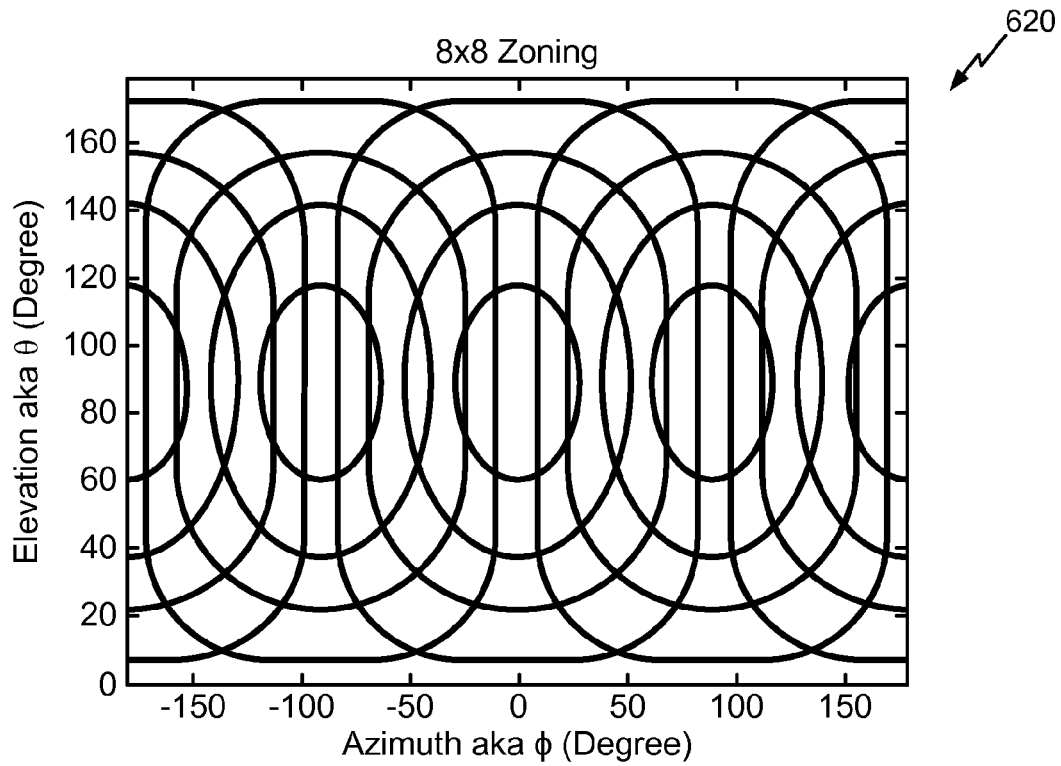
FIG. 6B illustrates an 8×8 spherical zoning represented as a 2D zoning map.

Zoning maps can also be created for larger 2D UPA arrays. FIGS. 6A and 6B illustrate two different representations of an 8×8 spherical zoning. FIG. 6A illustrates an 8×8 spherical zoning represented as a unit sphere 610, while FIG. 6B illustrates an 8×8 spherical zoning represented as a 2D zoning map 620. As with 4×4 arrays, not all zone numbers exist. Specifically, for an 8×8 array, zone numbers (0,0), (0,1), (0,7), (1,0), and (7,0) do not exist.

To create an 8×8 spherical zoning, the x-axis and y-axis are independently divided into eight zones. Thus, the zone numbers are $(b_x, b_y)_{8\times 8} \in \{0:7\} \times \{0:7\}$. An arbitrary angle $(\phi, \theta)$ belongs to zone $(b_x, b_y)_{8\times 8}$ where:

$$b_x = \text{round}(B \cdot (1 - \sin\theta\cos\phi)/2)$$

$$b_y = \text{round}(B \cdot (1 - \sin\theta\sin\phi)/2)$$

Figure 7:
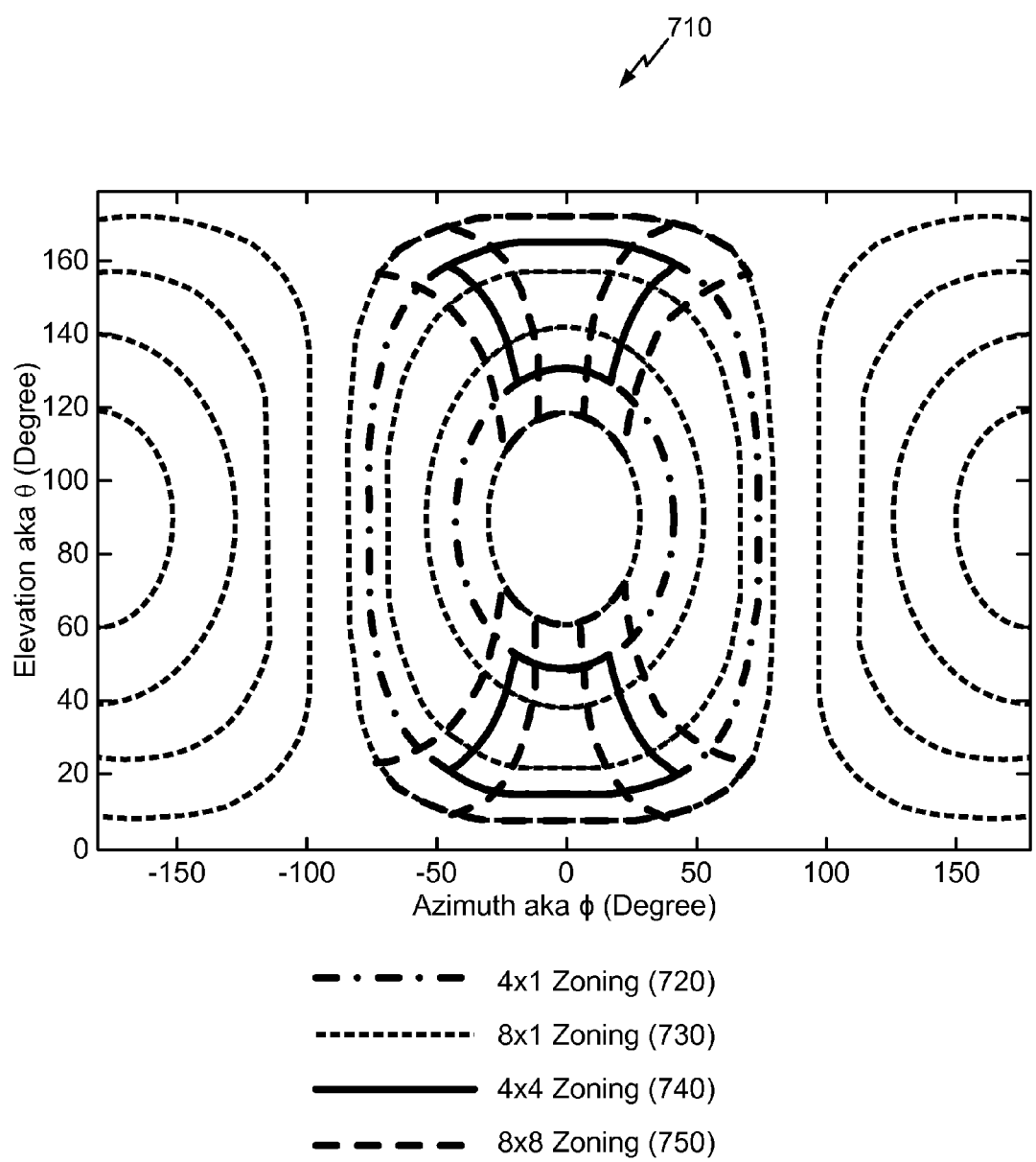
FIG. 7 is a graph illustrating the expansion of a 4×4 spherical zoning to an 8×8 spherical zoning.

FIG. 7 is a graph 710 illustrating the expansion of a 4×4 spherical zoning to an 8×8 spherical zoning. Each zone in a 4×4 spherical zoning corresponds to nine zones in an 8×8 spherical zoning. Given a zone number $(b_x, b_y)_{4\times 4}$ in a 4×4 spherical zoning, the corresponding zone numbers in an 8×8 spherical zoning are $(b'_x, b'_y)_{8\times 8} = \{2b_x-1:2b_x+1\} \times \{2b_y-1:2b_y+1\}$. Thus, given a zone number $(b_x, b_y)_{4\times 4} = (1,2)$ in the 4×4 spherical zoning 740, the corresponding zone numbers in the 8×8 spherical zoning 750 are $(b'_x, b'_y)_{8\times 8} = \{(1,3), (1,4), (1,5), (2,3), (2,4), (2,5), (3,3), (3,4), (3,5)\}$. FIG. 7 also illustrates the corresponding 4×1 spherical zoning 720 for zone number $b_4=1$ and 8×1 spherical zoning 730 for all zone numbers. Note that zones 1-3 of the 8×1 spherical zoning 730 intersect with zone number $b_4=1$ of the 4×1 spherical zoning 720. As can be seen in FIG. 7, the effect of increasing the number of zones is that each zone covers a smaller area of the sphere.

Figure 8A:
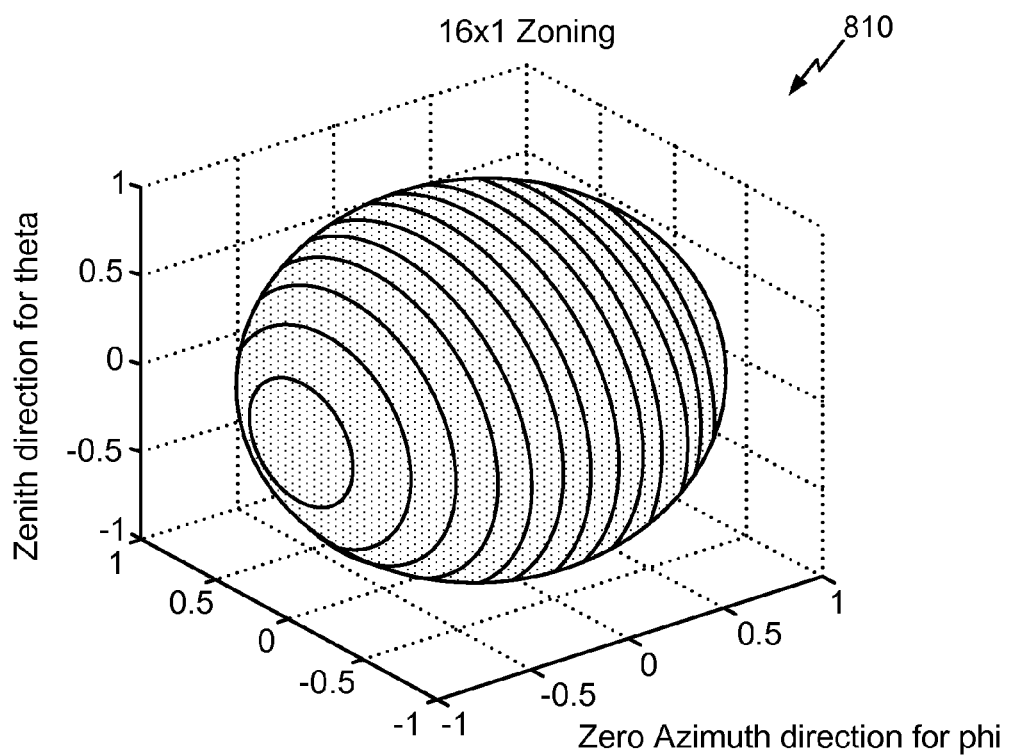
FIG. 8A illustrates a 16×1 spherical zoning represented as a unit sphere.

While the various embodiments discuss 4×1, 8×1, 4×4, and 8×8 spherical zonings in detail, spherical zonings can be any size. FIG. 8A illustrates a 16×1 spherical zoning represented as a unit sphere 810. Such a large one-dimensional spherical zoning is generally not preferable because it can easily off-align along certain directions. Thus, a 4×4 spherical zoning would be more preferable. However, a 16×1 spherical zoning can be used for beam refinement. For example, an 8×1 spherical zoning could be expanded to a 16×1 spherical zoning, or an 8×8 spherical zoning could be expanded to a 16×16 spherical zoning.

Figure 8B:
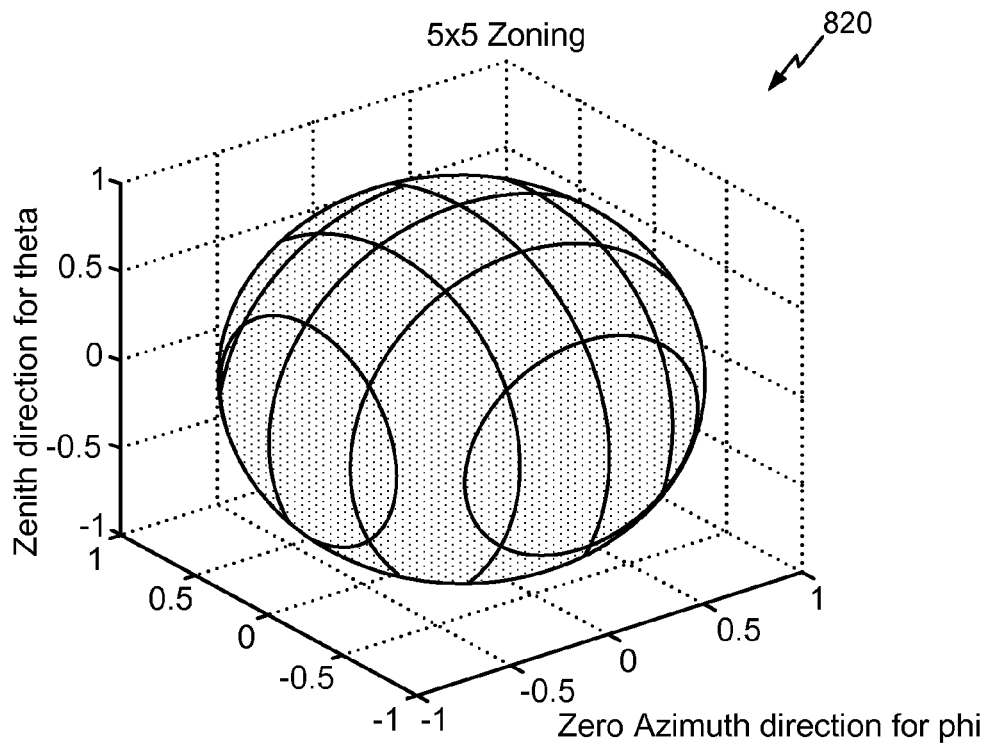
FIG. 8B illustrates a 5×5 spherical zoning represented as a unit sphere.

FIG. 8B illustrates a 5×5 spherical zoning represented as a unit sphere 820. The special characteristics of an odd-numbered spherical zoning include zone division lines on the x-axis, y-axis, and z-axis. The steering angle of the zones also shifts.

For a generic $B_x \times B_y$ spherical zoning, the zone number $(b_x, b_y)_{Bx \times By} \in \{0, 1, \ldots, B_x-1\} \times \{0, 1, \ldots, B_y-1\}$. Note that some zone numbers will be non-existent. The steering angle $(\theta_b, \phi_b)$ satisfies:

$$\cos\phi_b \sin\theta_b = (1 - 2b_x/B_x)$$

$$\sin\phi_b \sin\theta_b = (1 - 2b_y/B_y)$$

An arbitrary direction $(\theta, \phi)$ belongs to zone $(b_x, b_y)_{Bx \times By}$ where:

$$b_x = \text{round}(\text{Beam} \cdot (1 - \sin\theta\cos\phi)/2)$$

$$b_y = \text{round}(\text{Beam} \cdot (1 - \sin\theta\sin\phi)/2)$$

When navigating the zones, neighbor zones of $(b_x, b_y)_{Bx \times By}$ are $(b_x \pm 1, b_y)_{Bx \times By}$ and $(b_x, b_y \pm 1)_{Bx \times By}$. For refining zones, while doubling $B_x$ or $B_y$, the zoning expanding rule applies.

Table 1 illustrates the properties of the standard-size spherical zones. As can be seen, one-dimensional spherical zoning divides space equally. 2D spherical zoning is not as uniform, with wider zones along the x-axis and y-axis and narrower zones along the z-axis. Note that the actual beamwidth and antenna gain formed by the antenna array may be different than the values shown.

TABLE 1

| Zoning | Zone numbers of special directions | Apex Angle<br>If a zone is converted to a spherical cone of the same spherical surface area, the apex is the tip of the cone and the apex angle is the angle between the lines that define the apex | Hypothetical Gain<br>If the antenna emits all its energy towards directions defined by the zone, the effective gain, measured in dB, is the ratio over an omni-directional antenna pattern |
|---|---|---|---|
| 4 × 1 Zoning | 0-3 | 83° (consistent) | 6.0 dB (consistent) |
| 8 × 1 Zoning | 0-7 | 58° (consistent) | 9.0 dB (consistent) |
| 4 × 4 Zoning | (2, 2) at zenith direction | 33° (min) | 13.9 dB (max) |

TABLE 1-continued

| Zoning | Zone numbers of special directions | Apex Angle If a zone is converted to a spherical cone of the same spherical surface area, the apex is the tip of the cone and the apex angle is the angle between the lines that define the apex | Hypothetical Gain If the antenna emits all its energy towards directions defined by the zone, the effective gain, measured in dB, is the ratio over an omni-directional antenna pattern |
|---|---|---|---|
| 4 × 4 Zoning | (0, 2), (2, 0) at x-axis and y-axis directions | 55° (max) | 9.4 dB (min) |
| 8 × 8 Zoning | (4, 4) at zenith direction | 16° (min) | 20.0 dB (max) |
| 8 × 8 Zoning | (0, 4), (4, 0) at x-axis and y-axis directions | 33° (max) | 13.8 dB (min) |

Realizing the Zoning

Once the spherical zone maps have been generated, the various embodiments assign an antenna weight vector (AWV) to each zone. The various embodiments make several assumptions about the antenna array. First, the generic antenna array size is $M_x \times M_y$ (for a ULA antenna, $M_y$ is equal to one). Second, the number of zones is greater than the number of antennas, i.e. $B_x > M_x$ and $B_y > M_y$. Third, the phase resolution is R=4. Finally, the AWV is a vector of size ($M_x \times M_y$), such that $$w_{M_x \times M_y} = (w_{1,1}, \ldots, w_{1,M_y}, w_{2,1}, \ldots, w_{2,M_y}, \ldots, w_{M_x,1}, \ldots, w_{M_x,M_y}).$$

To realize $B_x \times B_y$ zoning, the AWV setting is defined by a canonical weight function for zone $(b_x, b_y)_{Bx \times By}$ such that $$w_{m_x, m_y}(b_x, b_y) = e^{-\frac{j2\pi}{R} \cdot round\left(\frac{R \cdot m_x \cdot (b_x + b_x/2) \bmod (B_x)}{B_x} + \frac{R \cdot m_y \cdot (b_y + b_y/2) \bmod (B_y)}{B_y}\right)}.$$

The total number of beams is the same as the total number of zones ($B_x \times B_y$). The zone number can also be used as the beam number. That is, beam $(b_x, b_y)_{Bx \times By}$ can be denoted as the beam realized by canonical AWV setting for zone $(b_x, b_y)_{Bx \times By}$.

FIGS. 9A-9C illustrate matrices of example AWVs. Each row of a matrix represents the AWV for a zone number. The number of rows is the total number of zones in the zoning. FIG. 9A illustrates the AWV matrices for an antenna array size that varies from 3×1 to 5×1. FIG. 9B illustrates the AWV matrices for a zoning size that varies from 4×1 to 16×1. FIG. 9C illustrates the AWV matrices for both the antenna array size and zoning size varying from one dimension to two dimensions.

Note that the highlighted weights remain unchanged, which simplifies beam refinement. In FIG. 9A, highlighted cells 910a are the same as highlighted cells 910b. In FIG. 9B, highlighted cells 922a are the same as highlighted cells 922b, highlighted cells 924a are the same as highlighted cells 924b, highlighted cells 926a are the same as highlighted cells 926b, and highlighted cells 928a are the same as highlighted cells 928b. In FIG. 9C, highlighted cells 930a are the same as highlighted cells 930b.

Selecting Antenna Array Size

There will usually not be a 1-1 correspondence between the number of zones (B) and the number of antennas (M). Rather, there will usually be more zones than antennas. Realizing the zones by different antenna array sizes produces different beamwidth and gain. For instance, smaller antenna arrays tend to have beams with wider beamwidth and smaller gain, while larger antenna arrays tend to have beams with narrower beamwidth and larger gain.

Figure 10:
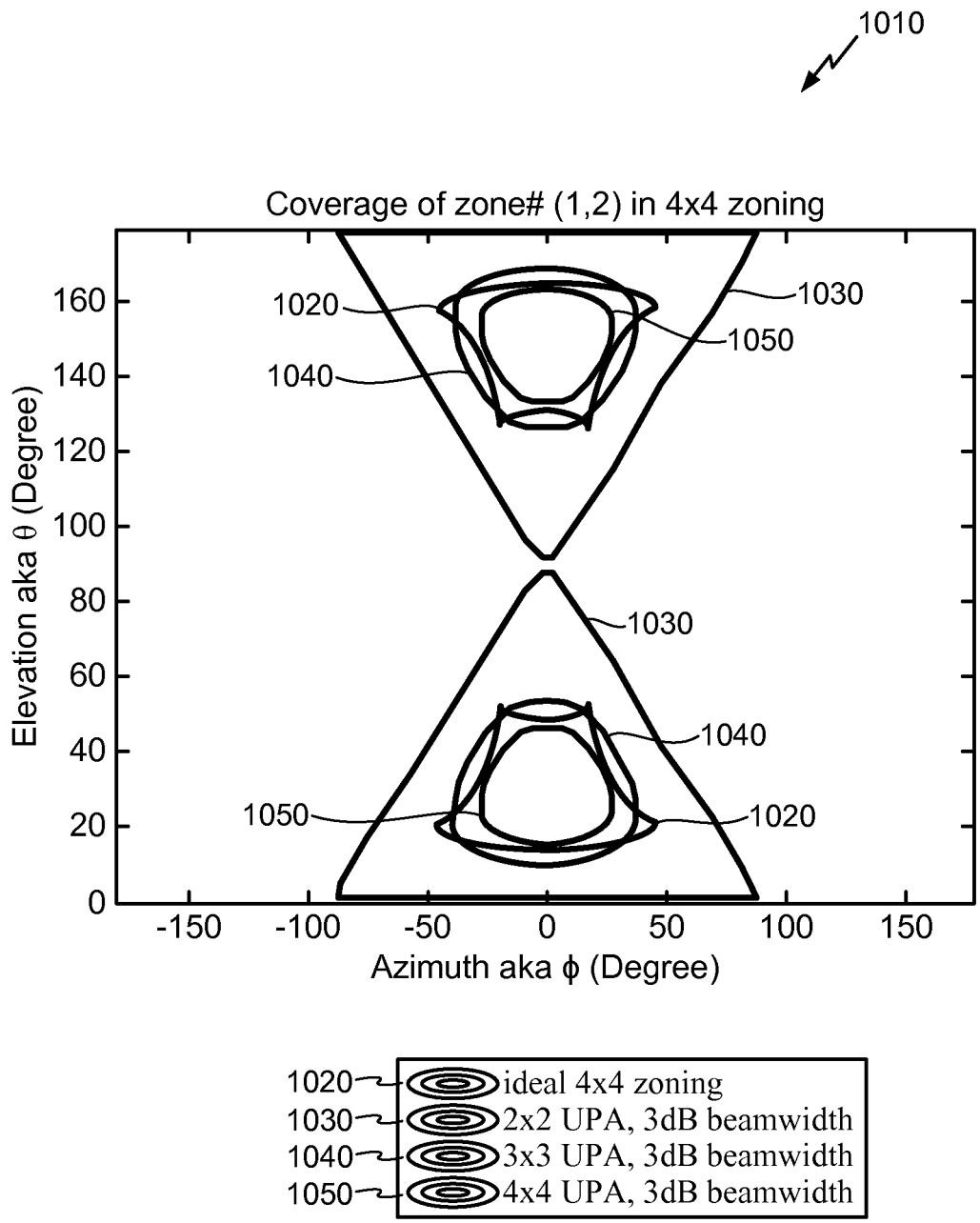
FIG. 10 illustrates a graph of a beamwidth example.

Beamwidth is the angle between the half-power (−3 dB) points of the main beam, or the angle within 3 dB loss from the maximum gain. FIG. 10 illustrates a graph 1010 of a beamwidth example. In the example illustrated in FIG. 10, beam $(1,2)_{4 \times 4}$ realizes zone $(1,2)_{4 \times 4}$. Region 1020 illustrates an ideal 4×4 zoning. Region 1030 illustrates the coverage provided by a 2×2 UPA with a 3 dB beamwidth. Region 1040 illustrates the coverage provided by a 3×3 UPA with a 3 dB beamwidth. Region 1050 illustrates the coverage provided by a 4×4 UPA with a 3 dB beamwidth.

Once the AWVs have been calculated, the various embodiments select the appropriate antenna array size to provide the maximum realized gain for a given zoning. The preferred scenario is to have enough antennas to provide sufficient realized gain (gain is the ability of an antenna to increase the power or amplitude of a signal) for a UE, such as UE 130, to utilize the beam realizing the zone in which the UE is present. Realized gain is, for any direction, the best gain that can be realized by any zone among all the zones. This value generally has to be determined from simulations.

At the lower bound, too few antenna array elements cannot create enough zones, and the antenna gain is low. Assuming $B_x$ zones and $M_x$ antenna elements along the x-axis, with 90° phase resolution, the number of zones cannot exceed the distinctive number of antenna settings, i.e. $B_x \leq 4^{(Mx-1)}$. Therefore, $M_x \geq \log_2 B_x/2 + 1$. The $B_y$ zones and $M_y$ antenna elements along the y-axis can be considered independently.

At the upper bound, too many antenna array elements cause coverage issues because of narrow beamwidth. The ideal maximum gain is $G_{max} = 10 * \log_{10}(M_x) + 10 * \log_{10}(M_y)$. Given the 3 dB beamwidth definition, the beamwidth gain is then ($G_{max}$−3 dB).

There are three antenna array size selection methods. The first is to select the antenna array size with the highest realized gain with guaranteed 3 dB coverage. A 3 dB coverage condition means that for any given direction $(\theta, \phi)$, $G(\theta, \phi) \geq$ beamwidth gain=($G_{max}$−3 dB). However, in some cases, the realized gain can be higher in value, but drops below the beamwidth gain in comparison to $G_{max}$. The second is to select the antenna array size with the highest realized gain, regardless of 3 dB coverage. The third is to select the antenna array size with the widest beams, so that the beam is less likely to be off-aligned. The lower bound value may be used in this case.

Table 2 illustrates a comparison of these three methods for exemplary zonings.

TABLE 2

| ULA or UPA | Ideal Max Gain (dB) | Beamwidth Gain (dB) | Realized Gain (dB) |
|---|---|---|---|
| 4 × 1 Zoning | | | |
| 2 × 1* | 3.0 | 0.0 | 2.3* |
| 3 × 1*** | 4.8 | 1.8** | 2.9*** |
| 4 × 1 | 6.0 | 3.0 | 2.3 |
| 8 × 1 Zoning | | | |
| 3 × 1* | 4.8 | 1.8 | 4.0* |
| 4 × 1 | 6.0 | 3.0 | 4.5 |
| 5 × 1*** | 7.0 | 4.0** | 5.2*** |
| 6 × 1 | 7.8 | 4.8 | 5.0 |
| 4 × 4 Zoning | | | |
| 2 × 2* | 6.0 | 3.0 | 4.7* |
| 2 × 3, 3 × 2** | 7.8 | 4.8** | 5.2 |
| 2 × 4, 4 × 2 | 9.0 | 6.0 | 4.7 |
| 3 × 3*** | 9.5 | 6.5 | 5.8*** |
| 3 × 4, 4 × 3 | 10.8 | 7.8 | 5.2 |
| 8 × 8 Zoning | | | |
| 3 × 3* | 9.5 | 6.5 | 8.2* |
| 3 × 4, 4 × 3 | 10.8 | 7.8 | 8.9 |
| 3 × 5, 5 × 3 | 11.8 | 8.8 | 9.5 |
| 4 × 4 | 12.0 | 9.0 | 9.9 |
| 3 × 6, 6 × 3 | 12.6 | 9.6 | 9.5 |
| 4 × 5, 5 × 4** | 13.0 | 10.0** | 10.3 |
| 3 × 7, 7 × 3 | 13.2 | 10.2 | 9.5 |
| 4 × 6, 6 × 4 | 14.8 | 10.8 | 10.5 |
| 5 × 5 | 14.0 | 11.0 | 10.8 |
| 4 × 7, 7 × 4 | 14.5 | 11.5 | 10.3 |
| 5 × 6, 6 × 5 | 14.8 | 11.8 | 10.9 |
| 5 × 7, 7 × 5 | 15.4 | 12.4 | 10.8 |
| 6 × 6*** | 15.6 | 12.6 | 11.0*** |
| 6 × 7, 7 × 6 | 16.2 | 13.2 | 10.9 |

The single asterisks (*) show the widest beams. The advantage of this embodiment is that it is easy to maintain beam alignment.
The double asterisks (**) show the highest realized gain with guaranteed 3 dB coverage. The advantage of this embodiment is that there is only a small gain variance between different directions.
The triple asterisks (***) show the highest realized gain, regardless of 3 dB coverage. The advantage of this embodiment is that it provides a high realized gain in any arbitrary direction.

There are various other considerations for selecting an antenna array size. For instance, an antenna gain of 20 dB for the combined gain of the transmitter and receiver is desirable. Also, a wide beam is suitable for maintaining alignment. Further, a small number of zones implies low media access control (MAC) overhead on beamforming.

Embodiments also provide a hierarchical antenna array. Such an array uses wide and low-gain beams for sector sweep and narrow and high-gain beams for beam refinement. For example, given a 4×4 UPA, the sector sweep could be performed by a 4×1 ULA with an 8×1 zoning, providing 8 beams with 4.5 dB gain. The beam refinement could be performed by the full 4×4 UPA with an 8×8 zoning, providing 64 beams and 9.9 dB gain. Alternatively, given a 4×4 UPA, the sector sweep could be performed by a 2×2 UPA with a 4×4 zoning, providing 16 beams with 4.7 dB gain. The beam refinement could again be performed by the full 4×4 UPA with an 8×8 zoning, providing 64 beams and 9.9 dB gain. As another example, given a 6×6 UPA, the sector sweep could be performed by a 3×3 UPA with an 4×4 zoning, providing 16 beams with 5.8 dB gain. The beam refinement could be performed by the full 6×6 UPA with an 8×8 zoning, providing 64 beams and 11.0 dB gain.

Beam Tracking and Refinement

Once the AWVs have been determined and the antenna array size selected, the various embodiments provide a means for determining whether the UE tracking one beam should move to a neighbor zone and track another beam. Alternatively, the UE may have just entered the network region serviced by the antenna array or may have been powered up in the region. Generally, the UE should move to a neighboring zone when the alignment of the beam is off and there is a loss of sufficient gain. This could be due to the UE moving or to shadowing. Generally, a 3 dB gain loss implies beam alignment is off, thus triggering beam tracking and possible movement to a neighboring zone.

Figure 11A:
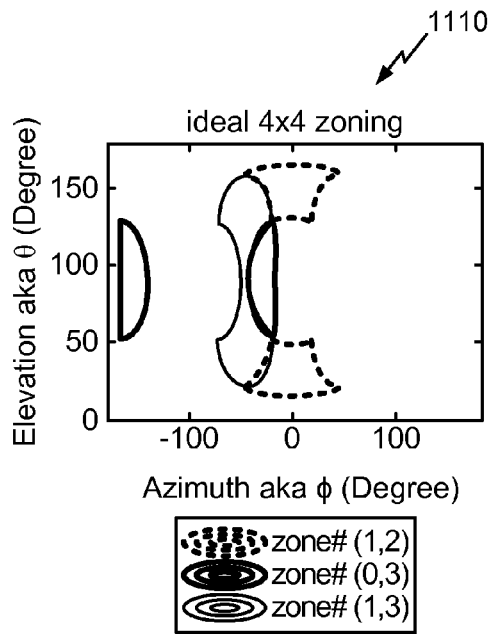
FIG. 11A illustrates a graph of an ideal 4×4 spherical zoning.
Figure 11B:
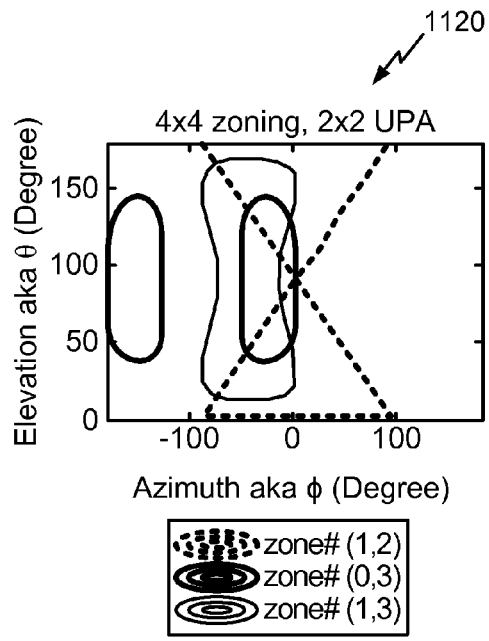
FIG. 11B illustrates a graph of a 4×4 zoning realized by a 2×2 UPA.
Figure 11C:
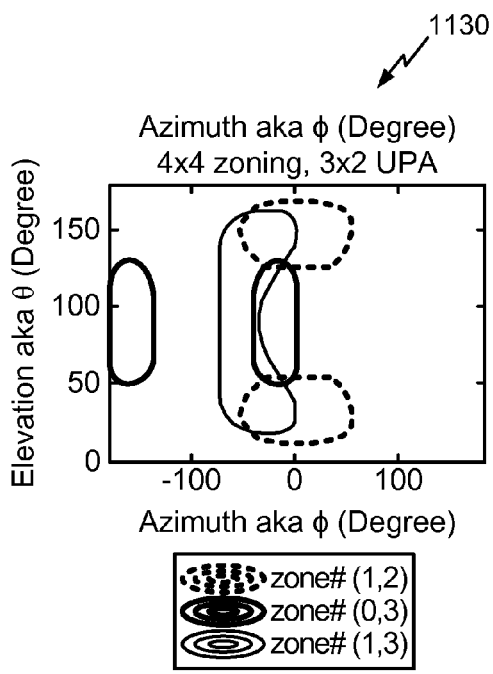
FIG. 11C illustrates a graph of a 4×4 zoning realized by a 3×2 UPA.
Figure 11D:
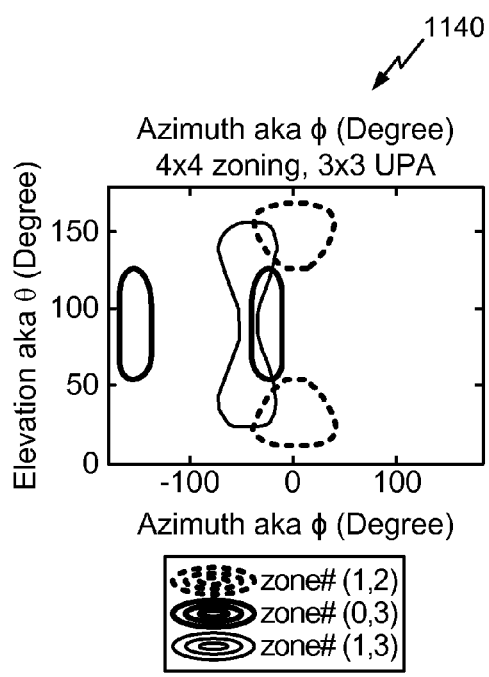
FIG. 11D illustrates a graph of a 4×4 zoning realized by a 3×3 UPA.

FIGS. 11A-11D illustrate a comparison of the effect of various antenna array sizes on beam tracking. Each figure illustrates a 3 dB beamwidth. FIG. 11A is a graph 1110 of an ideal 4×4 spherical zoning. FIG. 11B is a graph 1120 of a 4×4 spherical zoning realized by a 2×2 UPA. This configuration has the widest beams, thereby providing more overlap among beams and enabling a UE to move to a neighbor's neighboring zone. FIG. 11C is a graph 1130 of a 4×4 spherical zoning realized by a 3×2 UPA. This configuration provides the highest realized gain with guaranteed 3 dB coverage. FIG. 11D is a graph 1140 of a 4×4 spherical zoning realized by a 3×3 UPA. This configuration provides the highest realized gain, regardless of 3 dB coverage. There is less overlap among beams, so the UE tends to move only to neighboring zones.

A UE needs to determine where to move, i.e. which beam/zone to track. The receiver can move to a neighboring zone, meaning that if the UE is in zone $(b_x, b_y)$, it can move to zone $(b_x \pm 1, b_y)$ and zone $(b_x, b_y \pm 1)$. For example, the UE can move from zone (1,3) to zone (0,3) and (1,2). Alternatively, the UE can move to a neighbor's neighboring beam/zone, meaning that if the UE is in zone $(b_x, b_y)$, it can move to zone $(b_x \pm 2, b_y)$, $(b_x, b_y \pm 2)$, and $(b_x \pm 1, b_y \pm 1)$.

There are several algorithms for beam tracking. The IEEE 802.11ad standard provides a beam tracking protocol that allows transmitter beam tracking and receiver beam tracking. This protocol uses a beam refinement protocol (BRP) packet with a number of target reference number (TRN) fields.

In an embodiment, the UE tracks neighbor beams. This is suitable for narrow beams, where the antenna array size is selected according to the highest realized gain that it can provide, regardless of 3 dB coverage. The four neighboring zones and the current zone are trained, implying $N_{meas}$ equals five TRN fields in the BRP packet on the following zone numbers: $(b_x, b_y)$, $(b_x \pm 1, b_y)$, and $(b_x, b_y \pm 1)$. For example, referring to zoning map 520 of FIG. 5B, given a current zone (1,2), the UE would search zones (0,2), (1,1), (1,3), and (2,2) to find a better beam to track.

In another embodiment, the UE tracks the beams of the neighbors and the neighbor's neighbors. This is suitable for wide beams, where the antenna array size is selected according to the widest beam that it can provide. In addition to the four neighbor zones in the previous embodiment, the eight neighbor's neighbor zones are also trained. This implies $N_{meas}$ equals 13 TRN fields in the BRP packet on the following zone numbers: $(b_x, b_y)$, $(b_x \pm 1, b_y)$, $(b_x, b_y \pm 1)$, $b_y \pm 1)$, $(b_x \pm 2, b_y)$, and $(b_x, b_y \pm 2)$. For example, again referring to zoning map 520 of FIG. 5B, given the same current zone (1,2), in addition to the four zones listed above, the UE would also search zones (0,1), (0,3), (2,1), (2,3), (3,2), (1,0). Note that there are no zone numbers (−1,2) or (1,4).

The UE also needs to determine when to invoke beam tracking. In general, a 3 dB gain loss implies beam alignment is off, and thereby triggers beam tracking. Additionally or alternatively, even if there has not been a 3 dB gain loss, the UE can periodically perform beam tracking to search for a better beam(s), i.e. beam(s) with better gain. This is beam refinement.

The IEEE 802.11ad standard provides a beamforming protocol for beam refinement comprising a sector sweep phase and a beam refinement phase. In the sector sweep phase, the receiver selects a number of beams, called sectors, for control frame exchanges. Sector beams usually have wide beamwidth but low gain. The total number of sectors affects MAC overhead, so a smaller number is better.

In the beam refinement phase, once a sector beam is selected, the receiver selects a number of refinement beams for data frame exchanges. Refinement beams usually have a narrow beamwidth but high gain. If a better beam is found, the receiver will track it instead of the beam it had been tracking.

There are various ways to improve antenna gain. In a first embodiment for beam refinement, the number of antenna elements can be increased. Increasing the antenna array size immediately increases the ideal maximum gain $G_{max}$. However, increasing the antenna array size also decreases the beamwidth. If the original alignment is close to a beam edge, this method may not work very well. In that case, however, it is likely that an adjacent sector would have better gain anyway. Therefore, for this method to work, the original antenna array size must guarantee 3 dB coverage.

As an example, assume a 2×2 UPA is increased to a 3×3 UPA, with a 4×4 spherical zoning remaining unchanged. This would provide a 1.1 dB higher gain, i.e. from 4.7 dB to 5.8 dB (as shown in Table 2).

In a second embodiment for beam refinement, a different AWV can be tried. This may be beneficial where the steering angle of the sector beam may not align with the desired direction. Using a different spherical zoning can introduce zones with different steering angles. This also causes an increase in spherical zoning size.

As an example, assume a 4×4 spherical zoning is increased to an 8×8 spherical zoning with a 3×3 UPA remaining unchanged. This would provide a 2.4 dB higher gain, i.e. from 5.8 dB to 8.2 dB (as shown in Table 2). If the zoning size were to double, then $(b_x, b_y)_{Bx \times By}$ would correspond to $(b'_x, b'_y)_{2Bx \times 2By} \in \{2b_x-1:2b_x+1\} \times \{2b_y-1:2b_y+1\}$. The receiver would need to perform a beam refinement protocol over nine candidate zone numbers.

In a third embodiment, a combination of the first and second embodiments for beam refinement can be performed. This would increase the zone size and increase the antenna array size simultaneously.

As an example, assume a 4×4 spherical zoning is increased to an 8×8 spherical zoning and a 3×3 UPA is increased to a 6×6 UPA. This would provide a 5.2 dB higher gain, i.e. from 5.8 dB to 11.0 dB (as shown in Table 2). This resembles the second embodiment for beam refinement, in that the receiver needs to perform a beam refinement protocol over nine candidate zone numbers (because of doubling the zoning size), but it does not require the original antenna size to provide 3 dB coverage. This embodiment provides the best gain among the three embodiments for beam refinement.

Figure 12:
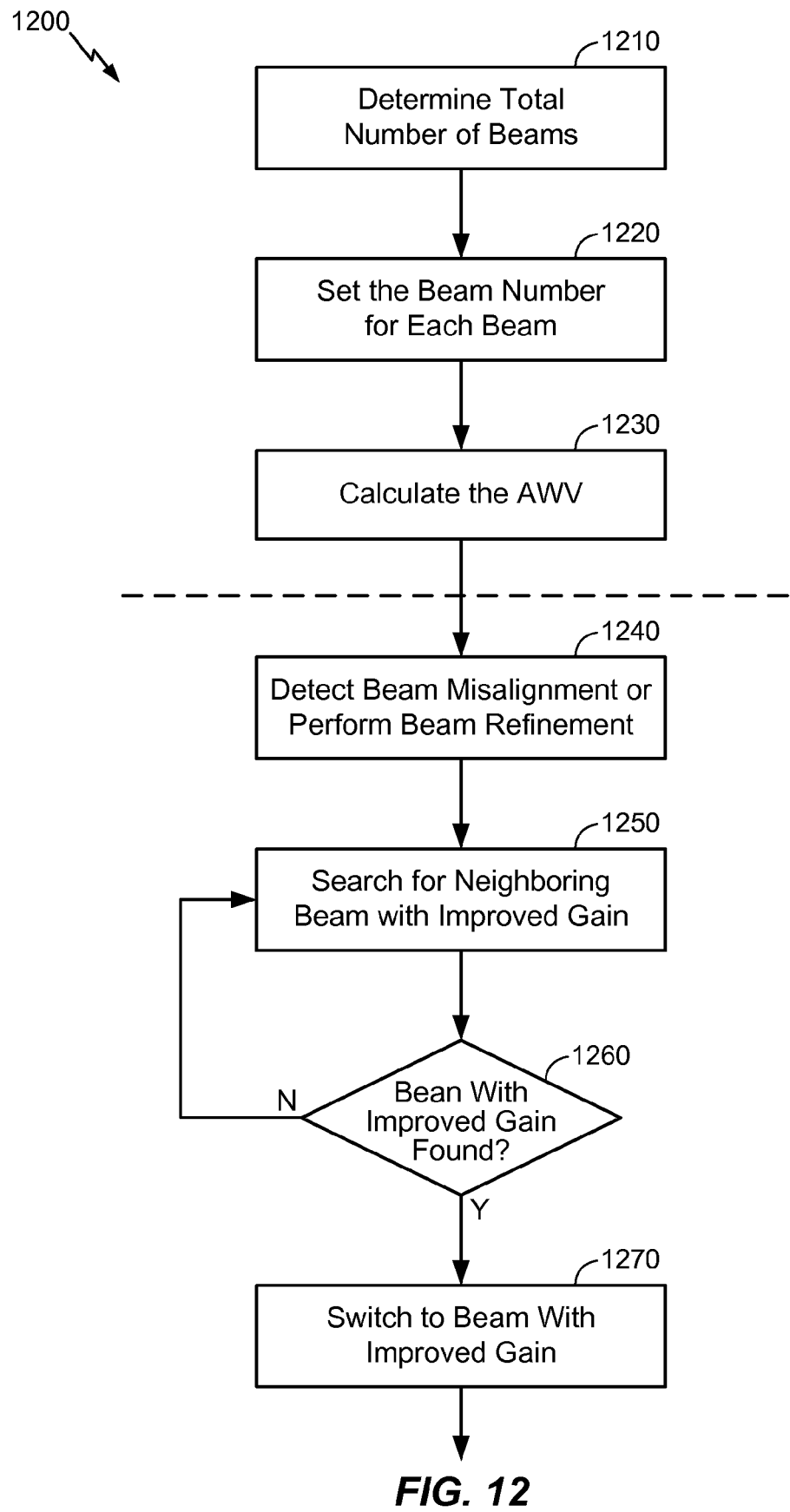
FIG. 12 illustrates a flowchart of an embodiment.

FIG. 12 illustrates an exemplary flow 1200 of an embodiment. The various features of FIG. 12 have been described in detail above. At 1210-1230, the beam controller of a UE, such as beam controller 134, calculates the AWV for the plurality of beams. At 1210, the beam controller determines the total number of beams to correspond to the total number of zones. At 1220, the beam controller sets the beam number for each beam based on the corresponding zone number. At 1230, the beam controller calculates the AWV based on the zone number. As discussed above, the AWV is defined by a canonical weight function of the zone number.

At 1240-1270, the beam controller performs beam tracking and refinement. At 1240, the beam controller detects a misalignment based on a loss of gain. Alternatively, the beam controller may determine to perform beam refinement. At 1250, the beam controller searches a plurality of neighbor beams to detect an improved alignment, or gain. At 1260, the beam controller determines whether a beam with improved gain has been found. If it has not, then the flow returns to 1250. If it has, then at 1270, the beam controller switches to the neighbor beam, or neighbor's neighbor beam, with the improved gain.

Effect of Zone/Beam Number Rotation

If the phased antenna array is not located in the x-y plane of the coordinate system, or if the antenna elements have a certain phase offset due to implementation impairment, then the beam with a specific beam number may not point towards the desired direction. This can also happen if the orientation of the phased antenna array is unknown to the receiver.

The zoning method can easily handle this coordinate rotation by simply rotating the zone numbers. For example, the receiver coordinate's zenith direction may not be aligned with the UPA coordinate's zenith direction. Specifically, assume the receiver coordinate's zenith direction is aligned with zone number $\tilde{b}$ in the UPA coordinate system. Under the receiver's coordinate system, the AWV corresponding to a zone number can be compensated by:

$$\tilde{W} = (w_1(\tilde{b}), \ldots, w_M(\tilde{b}))$$

where $w_m(\tilde{b})$ is the canonical weight function and $\tilde{b}$ is the zone number of calibration.

As a result, when the receiver wants a beam direction that is aligned with zone number b in the receiver's coordinate system, the AWV should be:

$$W'(b) = (w_1(b) \cdot w_1(\tilde{b}), \ldots, w_M(b) \cdot w_M(\tilde{b}))$$

This calculation shows that:

$$W'(b) = (w_1(b'), \ldots, w_M(b'))$$

where b' is such that $$b'_x = \left(b_x + \tilde{b}_x + \frac{B_x}{2}\right) \bmod (B_x)$$

and $$b'_y = \left(b_y + \tilde{b}_y + \frac{B_y}{2}\right) \bmod (B_y).$$

Note that if the zenith directions align between the receiver's coordinate system and the UPA coordinate system (for example, both are aligned along the z-axis), then $\tilde{b} = B/2$ and b'=b and there is not rotation.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the various embodiments.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment can include a computer readable media embodying a method for beam tracking and refinement. Accordingly, the various embodiments are not limited to illustrated examples and any means for performing the functionality described herein are included in the various embodiments.

While the foregoing disclosure shows illustrative embodiments, it should be noted that various changes and modifications could be made herein without departing from the scope of the various embodiments as defined by the appended claims. The functions, steps and/or actions of the method claims in accordance with the various embodiments described herein need not be performed in any particular order. Furthermore, although elements of the embodiments may be described or claimed in the singular, the plural is contemplated unless limitation to the singular is explicitly stated.

What is claimed is:

1. A wireless communications device, comprising:
a phased antenna array comprising a plurality of antennas;
a transceiver operatively coupled to the phased antenna array and configured to control the plurality of antennas and an antenna weight vector (AWV);
a memory storing a spherical zoning map; and
a beam controller configured to control the transceiver by setting the AWV for each antenna of the plurality of antennas.

2. The wireless communications device of claim 1, wherein the beam controller is further configured to determine the AWV for a plurality of beams.

3. The wireless communications device of claim 2, wherein the beam controller determines the AWV for the plurality of beams by:
determining a total number of beams to correspond to a total number of zones;
setting a beam number based on a zone number; and
calculating an AWV based on the zone number, wherein the AWV is defined by a canonical weight function of the zone number.

4. The wireless communications device of claim 1, wherein the beam controller is further configured to:
determine that a coordinate system alignment of the phased antenna array is different than a coordinate system alignment of a receiver device; and
compensate for the difference in coordinate system alignment by rotating zone numbers of the spherical zoning map.

5. The wireless communications device of claim 1, wherein a canonical weight function for a zone $(b_x, b_y)_{B_x \times B_y}$ is:

$$w_{m_x, m_y}(b_x, b_y) = e^{-i\frac{2\pi}{R} \cdot round\left(\frac{R \cdot m_x \cdot (b_x + B_x/2) mod(B_x)}{B_x} + \frac{R \cdot m_y \cdot (b_y + B_y/2) mod(B_y)}{B_y}\right)}$$

where $b_x$ represents a zone number along an x-axis, $b_y$ represents a zone number along a y-axis, $B_x$ represents a total number of zones along the x-axis, $B_y$ represents a total number of zones along the y-axis, $m_x$ represents a beam along the x-axis, $m_y$ represents a beam along the y-axis, and R is the radius of a beam.

6. The wireless communications device of claim 1, wherein the spherical zoning map comprises a two-dimensional representation of a unit sphere, where an x-axis and a y-axis of the unit sphere are divided into a set of numbered, non-overlapping zones.

7. The wireless communications device of claim 1, wherein a zoning configuration of a total number of zones is a one-dimensional or two-dimensional array.

8. The wireless communications device of claim 7, wherein the zoning configuration of the total number of zones is one of 4×1, 4×4, 8×1, or 8×8.

9. The wireless communication device of claim 1, wherein a zoning configuration of a total number of zones is a hexagonally-shaped two-dimensional array.

10. The wireless communications device of claim 1, wherein the beam controller is further configured to:
conduct a sector sweep using a total number of beams corresponding to a total number of zones.

11. The wireless communications device of claim 1, wherein the beam controller is further configured to:
detect a misalignment based on a loss of gain; and
search a plurality of neighbor beams to detect an improved alignment.

12. The wireless communications device of claim 1, wherein the zoning map is a first zoning map, the wireless communications device further comprising:
a second zoning map stored in the memory; and
a second plurality of beams.

13. The wireless communications device of claim 12, wherein a total number of zones of the second zoning map is greater than a total number of zones of the first zoning map.

14. The wireless communications device of claim 12, wherein the beam controller is further configured to:
set the AWV based on the second zoning map.

15. The wireless communications device of claim 12, wherein the second plurality of beams are configured for beam refinement.

16. The wireless communications device of claim 1, wherein the phased antenna array is a 60Ghz phased antenna array.

17. A method of wireless communication, comprising:
determining an antenna weight vector (AWV);
storing a spherical zoning map in a memory;
controlling a plurality of antennas of a phased antenna array; and
controlling, by a beam controller, a transceiver operatively coupled to the phased antenna array by setting the AWV for each antenna of the plurality of antennas.

18. The method of claim 17, further comprising:
determining, by the beam controller, the AWV for a plurality of beams.

19. The method of claim 18, wherein the determining the AWV for the plurality of beams comprises:

determining a total number of beams to correspond to a total number of zones;

setting a beam number based on a zone number; and calculating an AWV based on the zone number, wherein the AWV is defined by a canonical weight function of the zone number.

20. The method of claim 17, further comprising:

determining, by the beam controller, that a coordinate system alignment of the phased antenna array is different than a coordinate system alignment of a receiver device; and compensating, by the beam controller, for the difference in coordinate system alignment by rotating zone numbers of the spherical zoning map.

21. The method of claim 17, wherein a canonical weight function for a zone $(b_x, b_y)_{B_x \times B_y}$ is:

$$w_{m_x,m_y}(b_x, b_y) = e^{-\frac{j2\pi}{R} \cdot round\left(\frac{R \cdot m_x \cdot (b_x + B_x/2) mod(B_x)}{B_x} + \frac{R \cdot m_y \cdot (b_y + B_y/2) mod(B_y)}{B_y}\right)}$$

where $b_x$ represents a zone number along an x-axis, $b_y$ represents a zone number along a y-axis, $B_x$ represents a total number of zones along the x-axis, $B_y$ represents a total number of zones along the y-axis, $m_x$ represents a beam along the x-axis, $m_y$ represents a beam along the y-axis, and R is the radius of a beam.

22. The method of claim 17, wherein the spherical zoning map comprises a two-dimensional representation of a unit sphere, where an x-axis and a y-axis of the unit sphere are divided into a set of numbered, non-overlapping zones.

23. The method of claim 17, wherein a zoning configuration of a total number of zones is a one-dimensional or two-dimensional array.

24. The method of claim 23, wherein the zoning configuration of the total number of zones is one of 4×1, 4×4, 8×1, or 8×8.

25. The method of claim 17, wherein a zoning configuration of a total number of zones is a hexagonally-shaped two-dimensional array.

26. The method of claim 17, further comprising:

conducting, by the beam controller, a sector sweep using a total number of beams corresponding to a total number of zones.

27. The method of claim 17, further comprising:

detecting, by the beam controller, a misalignment based on a loss of gain; and searching, by the beam controller, a plurality of neighbor beams to detect an improved alignment.

28. The method of claim 17, wherein the zoning map is a first zoning map, the method further comprising:

storing a second zoning map in the memory; and establishing a second plurality of beams.

29. The method of claim 28, wherein a total number of zones of the second zoning map is greater than a total number of zones of the first zoning map.

30. The method of claim 28, further comprising:

setting, by the beam controller, the AWV based on the second zoning map.

31. The method of claim 28, wherein the second plurality of beams are configured for beam refinement.

32. The method of claim 17, wherein the phased antenna array is a 60 Ghz phased antenna array.

33. A wireless communications device, comprising:

logic configured to determine an antenna weight vector (AWV);

logic configured to storing a spherical zoning map in a memory;

logic configured to control a plurality of antennas of a phased antenna array; and logic configured to control, by a beam controller, a transceiver operatively coupled to the phased antenna array by setting the AWV for each antenna of the plurality of antennas.

34. A wireless communications device, comprising:

means for determining an antenna weight vector (AWV);

means for storing a spherical zoning map in a memory;

means for controlling a plurality of antennas of a phased antenna array; and means for controlling, by a beam controller, a transceiver operatively coupled to the phased antenna array by setting the AWV for each antenna of the plurality of antennas.

35. A non-transitory computer-readable medium for wireless communications, comprising:

at least one instruction to determine an antenna weight vector (AWV);

at least one instruction to storing a spherical zoning map in a memory;

at least one instruction to control a plurality of antennas of a phased antenna array; and at least one instruction to control, by a beam controller, a transceiver operatively coupled to the phased antenna array by setting the AWV for each antenna of the plurality of antennas.

* * * * *